Figure 1:
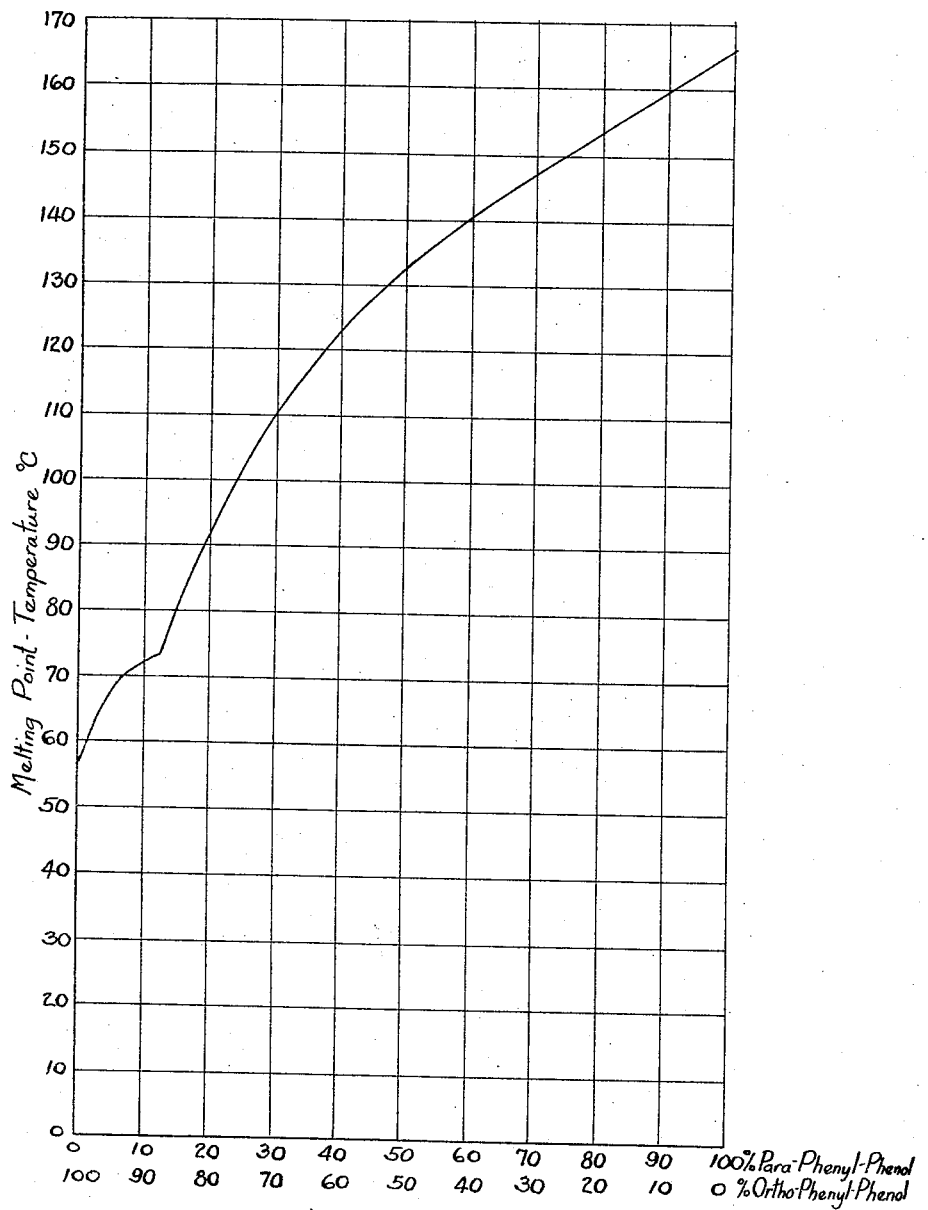

Patented Nov. 8, 1932

1,887,227

UNITED STATES PATENT OFFICE

EDGAR C. BRITTON AND FRED BRYNER, OF MIDLAND, MICHIGAN, ASSIGNORS TO THE DOW CHEMICAL COMPANY, OF MIDLAND, MICHIGAN, A CORPORATION OF MICHIGAN

METHOD OF SEPARATING PHENYLPHENOLS

Application filed December 5, 1929. Serial No. 411,762.

The present invention relates to a method for the separation of phenylphenols, particularly of ortho- and para-phenylphenols, by treating a mixture thereof with an alkaline earth oxide or hydroxide in water solution or suspension.

We have discovered that ortho- and para-phenylphenols can be reacted with alkaline earth hydroxides in the presence of water to form compounds, for example, alkaline earth di-phenylphenates, or basic salts, and further, that the resulting para-compound is less soluble in water than is the corresponding ortho-compound. Hence, a mixture of phenylphenols, e. g. ortho- and para-phenylphenols, may be separated substantially into its components by the present method which involves treating such mixture with an alkaline earth hydroxide, or equivalent, in the presence of water. Our invention, then, consists of the method hereinafter fully described and particularly pointed out in the claims, the annexed drawing and the following description setting forth in detail several modes of carrying out our invention, such disclosed modes illustrating, however, but several of various ways in which the principle of the invention may be used.

In said annexed drawing:—

Fig. 1 is a chart giving a curve which shows the relationship between percentage composition of mixtures of ortho- and para-phenylphenols and the melting points of said mixture.

In general, a mixture of ortho- and para-phenylphenols may be separated substantially into its components as follows; such mixture may be heated with an aqueous solution or suspension of calcium oxide, hydroxide or other equivalent alkaline earth compound, preferably in excess of the amount thereof theoretically required to completely react with the phenylphenols to form a normal salt therewith, until substantially complete solution of the ortho-compound occurs, whereupon the liquid is cooled and filtered or otherwise separated from residual solid material. The filtrate, upon acidification thereof, with an acid, e. g. hydrochloric acid, yields ortho-phenylphenol. The solids from the original reaction mixture, containing the greater part of the para-compound in combined form, for instance as a normal or basic calcium salt, may be boiled with a solution of sodium hydroxide and carbonate, and the solution separated from residual solids in any suitable manner and then acidified, whereby para-phenylphenol is precipitated.

In case the phenylphenol mixture contains alkali-insoluble impurities, such as diphenyl oxide, diphenylene oxide, etc., the alkaline reaction mixture may be treated to separate the same therefrom, e. g. steam distilled or extracted with an immiscible solvent, such as chlorobenzene. In the latter case, the extracted material plus the solvent may be filtered or otherwise manipulated to remove solid matter, after which the solvent may be separated from the aqueous filtrate.

The following examples represent ways of carrying out our invention. The composition of the products and starting materials may be determined by comparing the melting points thereof with the melting point curve shown in Fig. 1. Substantially pure ortho- and para-phenylphenols melt at about 57° C. and 166–7° C. respectively.

Example 1

A mixture (M. P. 123° C.) of 6 and 4 grams, respectively, of ortho- and para-phenylphenols was heated for 3 hours at about 100° C. with a suspension of 18.9 grams of barium hydroxide $(Ba(OH)_2 \cdot 8H_2O)$ in 150 grams water. The filtrate from the cooled and filtered reaction mixture was acidified with hydrochloric acid, thereby precipitating 5.5 grams crude ortho-phenylphenol (M. P. 71° C.), i. e. a 92 per cent yield. The precipitated barium compound was decomposed with hydrochloric acid and filtered from the residual solution, thereby obtaining 3.8 grams para-phenylphenol (M. P. 167° C.) i. e. a 95 per cent yield.

Barium di-paraphenylphenate is a white solid, relatively insoluble in water and the usual inert organic solvents, and is decomposable by hydrochloric or equivalent acid to form para-phenylphenol.

*Example 2*

In a 3 liter round-bottomed flask was placed 100 grams of a mixture of crude ortho- and para-phenyl phenol (M. P. 125° C.), 1500 cubic centimeters of water, and 33 grams of calcium oxide. The mixture was stirred at about 100° C. for 2½ hours, cooled to about 60° C., filtered to separate the liquid from the solids, and the latter then washed with water. The filtrate was acidified with hydrochloric acid, precipitating thereby crude ortho-phenylphenol which was filtered from residual liquid and distilled under reduced pressure. The yield was 41 grams of crude ortho-phenylphenol, boiling at 155–156° C. at 17 millimeters pressure, and having a freezing point of 64° C. A further 2 grams of crude product boiling at 156–180° C. at the same pressure, and melting at 100–101° C. A residue of 1 gram remained undistilled.

The insoluble residue from the reaction mixture after being washed with water, was heated with 50 cubic centimeters of chlorobenzene and 50 cubic centimeters of water, then cooled, filtered from liquid, and washed with another 50 cubic centimeters of chlorobenzene. The residual solid was then dissolved in 400 cubic centimeters of water containing 20 grams sodium carbonate and 16.5 grams sodium hydroxide, by heating at about 100° C. for ½ hour. After filtering off the thereby precipitated calcium carbonate, the filterate was treated with a decolorizing charcoal, again filtered, and acidified with hydrochloric acid, thus percipitating 37 grams of para-phenylphenol (M. P. 116.5–167° C.). A repeated hydroxide-carbonate treatment on the precipitated calcium carbonate, yielded an additional 2 grams of para-compound having the same melting point. The total yield of para-phenylphenol was 98.8 per cent.

*Example 3*

100 grams of a mixture of crude ortho- and para-phenylphenols (M. P. 125° C.) was agitated in 1500 cubic centimeters of water containing 33 grams calcium oxide, for one hour at about 100° C., the reaction mixture then being filtered while hot, i. e. at about 80° C., and the residual solids were washed with lime water. The filtrate was acidified with hydrochloric acid, preciptating thereby crude ortho-phenylphenol which was then separated from the liquid and distilled under reduced pressure. The yield was 38 grams of ortho-phenylphenol, boiling at 149–150° C. at 12 millimeters and freezing at 62.2° C., and a 6 gram fraction boiling at 150–180° C., and melting at 105° C. A 2 gram residue remained undistilled.

The insoluble material from the reaction mixture, after being digested in 400 cubic centimeters of water containing 20 grams of sodium carbonate and 9 grams of sodium hydroxide, for ½ hour at about 100° C., and then ¼ hour longer in the presence of one gram of Norite, i. e. a decolorizing carbon, was filtered from the hot liquid. The latter liquid was acidified with hydrochloric acid, thereby precipitating 38 grams of para-phenylphenol of M. P. 165.5° C. therefrom.

The para-phenylphenol was obtained in a 96 per cent yield, the ortho-compound in a 93 per cent yield, based on the quantities of said compounds present in the original mixture.

The herein described invention may be adapted not only to the separation of a mixture of phenylphenols, but also to the purification of the individual phenylphenols.

Other modes of applying the principle of our invention may be employed instead of those explained, change being made as regards the details, provided the step or steps stated by any of the following claims or the equivalent of such be employed.

We therefore particularly point out and distinctly claim as our invention:—

1. In a method of separating ortho- and para-phenylphenols the step which consists of heating a mixture of said compounds with an alkaline earth base in the presence of water to form alkaline-earth compounds thereof having relatively different solubilities.

2. In a method of separating ortho- and para-phenylphenols the step which consists of heating a mixture of said compounds with calcium hydroxide in the presence of water to form calcium compounds thereof having relatively different solubilities.

3. The method of separating ortho- and para-phenylphenols which comprises reacting a mixture of said compounds with an alkaline earth hyrdoxide in the presence of water, and separating the solid material containing the greater part of the relatively insoluble para-compound from the liquid containing the greater part of the relatively soluble ortho-compound.

4. The method of separating ortho- and para-phenylphenols which comprises reacting a mixture of said compounds with calcium hydroxide in the presence of water, and separating the solid material containing the greater part of the relatively insoluble para-compound from the liquid containing the greater part of the relatively soluble ortho-compound.

5. The method of separating ortho- and para-phenylphenols which comprises reacting a mixture of said compounds with an alkaline earth hydroxide in the presence of water, separating the solid material containing the greater part of the relatively insoluble para-compound from the liquid containing the greater part of the relatively soluble ortho-compound, and then treating the solids with an aqueous solution of sodium hydroxide and sodium carbonate, filtering the solution which contains sodium para-phenylphenate and acidifying to obtain para-phenylphenol therefrom, and then acidifying the original filtrate containing ortho-phenylphenol in combined form, to obtain free ortho-phenylphenol therefrom.

6. The method of separating ortho- and para-phenylphenols which comprises reacting a mixture of said compounds with calcium hydroxide in the presence of water, separating the solid material containing the greater part of the relatively insoluble para-compound from the liquid containing the greater part of the relatively soluble ortho-compound, and then treating the solids with an aqueous solution of sodium hydroxide and sodium carbonate, filtering the solution which contains sodium para-phenylphenate and acidifying to obtain para-phenylphenol therefrom, and then acidifying the original filtrate containing ortho-phenylphenol in combined form, to obtain free ortho-phenylphenol therefrom.

7. The method of separating ortho- and para-phenylphenols which comprises heating a mixture of said compounds with an alkaline-earth hydroxide in the presence of water, separating the solid material containing the greater part of the para compound from the liquid containing the greater part of the ortho compound, acidifying such liquid to precipitate ortho-phenylphenol therefrom, fractionally distilling the latter, and recovering para-phenylphenol from the abovesaid solid material.

8. The method of separating ortho- and para-phenylphenols which comprises heating a mixture of said compounds with calcium hydroxide in the presence of water, separating the solid material containing the greater part of the para compound from the liquid containing the greater part of the ortho compound, acidifying such liquid to precipitate ortho-phenylphenol therefrom, fractionally distilling the latter, and recovering para-phenylphenol from the abovesaid solid material.

9. In a method of separating ortho- and para-phenylphenols, the steps which consist in reacting a mixture of said compounds with an alkaline earth metal base in the presence of water to form a relatively insoluble alkaline earth metal salt of para-phenylphenol and a relatively soluble alkaline earth metal salt of ortho-phenylphenol, separating the relatively insoluble salt of para-phenylphenol from the reaction mixture and reacting said salt with a mineral acid to liberate para-phenylphenol as the free compound.

Signed by us this 26 day of November, 1929.

EDGAR C. BRITTON.
FRED BRYNER.